United States Patent [19]
Gronwick

[11] Patent Number: 5,755,253
[45] Date of Patent: May 26, 1998

[54] FLUSHOMETER AUXILIARY VALVE

[75] Inventor: Jerry P. Gronwick, Park Ridge, Ill.

[73] Assignee: Sloan Valve Company, Franklin Park, Ill.

[21] Appl. No.: 805,670

[22] Filed: Feb. 27, 1997

[51] Int. Cl.$^6$ .......... F16K 43/00; F16K 31/145; F16K 31/385
[52] U.S. Cl. ............................. 137/315; 251/40
[58] Field of Search ..................... 251/40; 137/315

[56] References Cited

U.S. PATENT DOCUMENTS

| 5,213,305 | 5/1993 | Whiteside et al. | 251/40 |
| 5,295,655 | 3/1994 | Wilson et al. | 251/40 |
| 5,332,192 | 7/1994 | Whiteside | 251/40 |
| 5,335,694 | 8/1994 | Whiteside | 251/40 |
| 5,490,659 | 2/1996 | Whiteside | 251/40 |
| 5,505,427 | 4/1996 | Whiteside | 251/40 |

*Primary Examiner*—George L. Walton
*Attorney, Agent, or Firm*—Dorn, McEachran, Jambor & Keating

[57] ABSTRACT

A diaphragm-type of flush valve for use with toilet devices such as urinals and water closets has a body with an inlet and an outlet. There is a valve seat between the inlet and the outlet and a valve member is movable to a closing position on the valve seat to stop flow through the flush valve. The valve member includes a diaphragm which is peripherally attached to the body and there is a pressure chamber above the diaphragm for holding the valve member on the valve seat. A bypass orifice connects the inlet and the pressure chamber. The diaphragm has a vent passage connecting the pressure chamber and the outlet. There is an auxiliary valve closing the vent passage, with the auxiliary valve including an auxiliary valve head and a stem extending downwardly therefrom. The auxiliary valve head has a bore with a lower open end. The bore has a first portion with a first diameter and a second portion with a larger diameter. The second portion of larger diameter is adjacent the lower open end of the bore. The stem has an end thereof positioned within the bore, with the stem end having an end portion with an outer diameter less than the outer diameter of the stem through a major portion of its length. The stem portion is received in the first bore portion when the stem is attached to the auxiliary valve head.

2 Claims, 1 Drawing Sheet

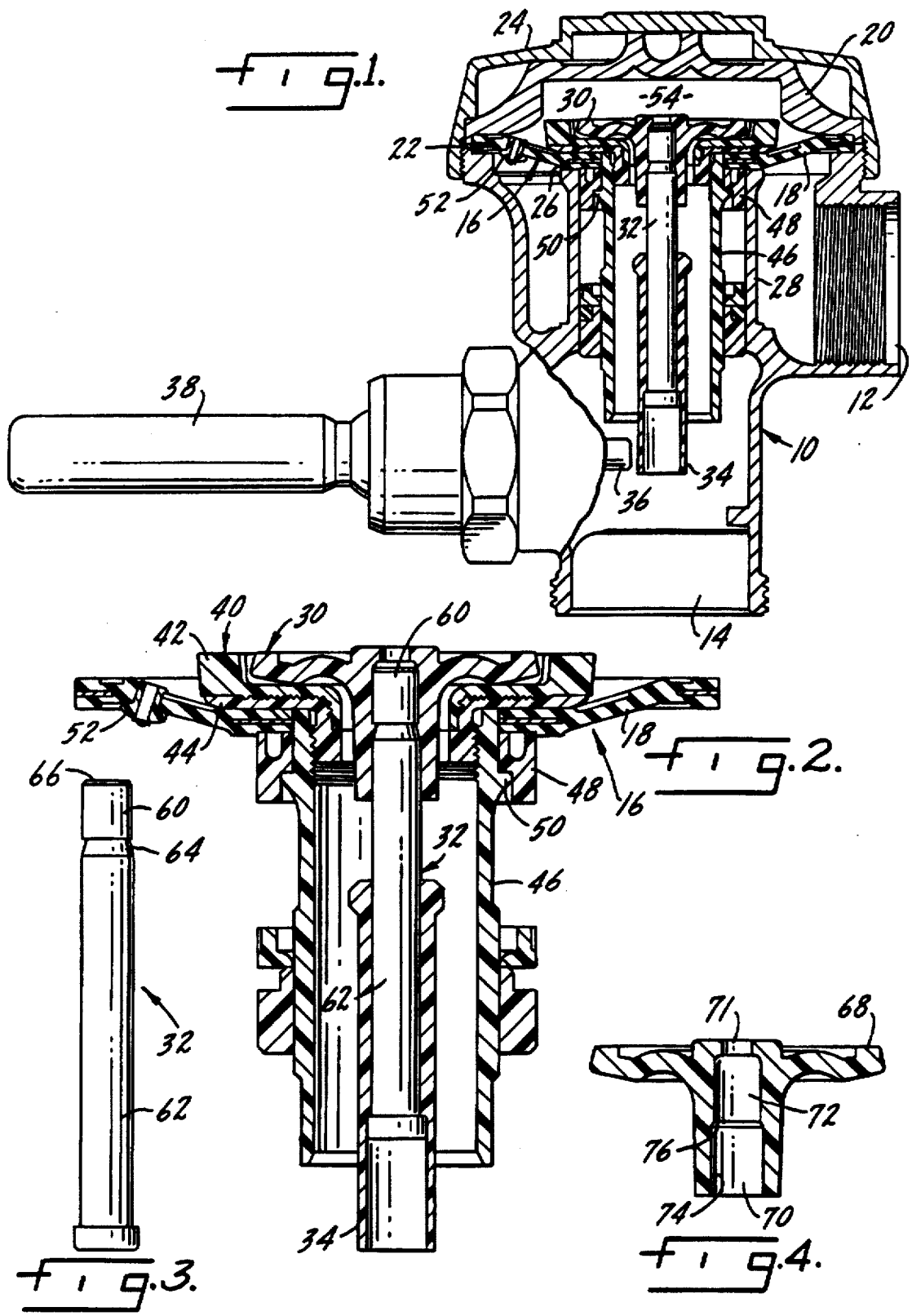

FLUSHOMETER AUXILIARY VALVE

THE FIELD OF THE INVENTION

The present invention relates to flush valves of the type used with toilet devices such as urinals and water closets and particularly to a diaphragm-type of flush valve. More specifically, the invention relates to the auxiliary valve which vents the pressure chamber which holds the diaphragm in a closed position. There has in the past been a problem in the assembly of the auxiliary valve which includes a valve head and a stem which extends downwardly therefrom and is positioned to be contacted by the flush valve handle. In prior art flush valves, and particularly the auxiliary valve, such as shown in U.S. Pat. No. 5,332,192, assigned to Sloan Valve Company, the assignee of the present application, there were no means to align the stem with the bore in the auxiliary valve head, with the result that assembly was not efficient and at times was cumbersome. Further, in the auxiliary valve shown in the '192 patent, the bore had the same inner diameter throughout its length, which inner diameter was smaller than the outer diameter of the stem which was positioned within the bore. The result was that the forcing of the valve stem into the bore passage caused a swaging or movement of the plastic material of the auxiliary valve head surrounding the bore, which also made assembly difficult.

The present invention provides an auxiliary valve head which has bore portions with different diameters and the stem which fits within the bore has stem portions with different diameters to mate with the corresponding bore portions. Further, the end of the stem which is to be aligned with the auxiliary valve head bore during assembly is chamfered for ease in aligning these two elements during assembly.

SUMMARY OF THE INVENTION

The present invention relates to an improved auxiliary valve for use in a diaphragm-type flush valve.

A primary purpose of the invention is to provide an auxiliary valve for use in a diaphragm-type flush valve which has the stem and the bore portion of the valve head formed with consistently variant diameters for ease in assembly.

Another purpose is an auxiliary valve head of the type described in which the end of the stem which is to be inserted within the valve head bore is chamfered for ease in alignment during the assembly process.

Other purposes will appear in the ensuing specification, drawings and claims.

BRIEF DESCRIPTION OF THE DRAWINGS

The invention is illustrated diagrammatically in the following drawings wherein:

FIG. 1 is a side view, in part section, illustrating a flush valve of the type described;

FIG. 2 is an enlarged section illustrating the diaphragm assembly;

FIG. 3 is an enlarged side view of the auxiliary valve stem; and

FIG. 4 is an axial section through the auxiliary valve head illustrating the valve head bore prior to positioning of the auxiliary valve stem therein.

DESCRIPTION OF THE PREFERRED EMBODIMENT

In the drawings, a flush valve of the type manufactured by the assignee of the present application, Sloan Valve Company, of Franklin Park, Ill., and sold under the trademark ROYAL, is shown to include a body 10 having an inlet connection 12 and an outlet connection 14. A diaphragm assembly, indicated generally at 16, includes a diaphragm 18 peripherally held to the body 10 by an inner cover 20. The diaphragm is seated upon a shoulder 22 at the upper end of body 10 and is clamped in this position by the inner cover 20. An outer cover 24 is screwthreaded onto the body to hold the inner cover in position.

The diaphragm assembly 16, as shown in FIG. 1, is closed upon a valve seat 26 formed at the upper end of a barrel 28. The barrel 28 forms the conduit connecting the valve seat with outlet 14. The diaphragm assembly 16 includes an auxiliary or relief valve 30 having a downwardly-extending stem 32 carrying a movable sleeve 34. Sleeve 34 is positioned for contact by a plunger 36 when operated by a handle 38 as is conventional in the operation of flush valves of the type disclosed.

Focusing specifically on the diaphragm assembly 16, in addition to the diaphragm 18 and the auxiliary valve 30, this assembly includes a retaining disc 40, having an upper portion 42 threaded to a lower portion 44. The retaining disc 40 is threadedly attached to a guide 46. A refill head 48 is seated on an outward shoulder 50 on the guide with the diaphragm 18 being clamped between the refill head 48 and the underside of retaining disc 40. Diaphragm 18 includes a bypass orifice 52 connected to the inlet or supply 12 to provide water for chamber 54 above diaphragm assembly 16. As is known in the art, flush valves of the type disclosed herein require pressure in chamber 54 in order to maintain the diaphragm closed upon its seat 26. Water at inlet 12 will flow through the described bypass to reach chamber 54 and will maintain the diaphragm in the closed position shown. Pressure in chamber 54 is vented through guide 46 which forms a vent passage, with flow through the passage being controlled by the auxiliary valve 30. When pressure within chamber 54 drops, the diaphragm assembly 16 is raised off of seat 26 by inlet pressure to open a flow path through the flush valve.

In the auxiliary valve 30 of the above-referenced '192 patent, the bore of the auxiliary valve, or relief valve as it is sometimes designated, has a constant internal diameter. The end of the valve stem which is received within the bore is stepped and has an O.D. greater than the I.D. of the valve head bore. This difference in diameters, although providing a firm press fit between the two elements, does not lend itself to ease of assembly. Further, because of the described difference in diameters there is often difficulty in aligning the end of the stem with the bore in the auxiliary valve head. The present invention overcomes these problems by the use of a stepped bore and a consistently stepped end on the valve stem 32.

As shown in FIGS. 3 and 4, the valve stem 32 has an end portion 60 which has an outer diameter slightly less than the outer diameter of the major portion 62 of the valve stem. The portions 60 and 62 are joined by a tapered stem portion 64 of short axial extent. The end of stem 34 has a chamfer 66 which is used in alignment of the stem with the auxiliary valve head bore prior to assembly.

The auxiliary valve head is indicated at 68 and has a bore 70 with a top vent hole 71. The bore 70 has a first portion 72 which has a smaller diameter than a second bore portion 74, with the bore portion 74 being adjacent the open end of bore 70. As shown in the assembly of FIG. 2, the stem will extend a substantial length of the bore 70, with the stem portion 60 of reduced outer diameter being positioned within the bore portion 72 having the smallest diameter. The tapered stem portion 64 will be positioned at the tapered junction or stop 76 between the bore portions of differing diameter indicated at 72 and 74. Thus, the depth of insertion is fixed as the tapered area 64 will contact the tapered area 76 of the bore or the junction between the two bore portions of differing diameter which will limit the extent to which the stem can be inserted within the bore of the auxiliary valve. Alignment during assembly is insured because of the chamfer 66 and the fact that stem portion 60 has a smaller diameter than bore portion 74. Any pressure built up above the stem during assembly will be vented through hole 71.

The invention is particularly concerned with an auxiliary valve head which is simple in construction and can be reliably assembled to give consistent product quality. The bore of the auxiliary valve head and its mating stem have portions of consistent diameter relationships so as to limit the extent to which the stem is inserted within the bore and to insure that the stem can be easily aligned with the bore prior to assembly.

Whereas the preferred form of the invention has been shown and described herein, it should be realized that there may be many modifications, substitutions and alterations thereto.

The embodiments of the invention in which an exclusive property or privilege is claimed are defined as follows:

1. A diaphragm-type of flush valve for use with toilet devices such as urinals and water closets including a body having an inlet and an outlet, a valve seat between said inlet and outlet and a valve member movable to a closing position on said valve seat to stop flow between said inlet and outlet, said valve member including a diaphragm peripherally attached to said body, a pressure chamber above said diaphragm for holding said valve member on said valve seat, a bypass orifice connecting said inlet and pressure chamber, a vent passage in said diaphragm connecting said pressure chamber and said outlet, and an auxiliary valve closing said vent passage, said auxiliary valve including an auxiliary valve head and a stem extending downwardly therefrom, said auxiliary valve head having a bore with a lower open end, said bore having a first portion with a first diameter and a second portion with a larger diameter, said second portion of larger diameter being adjacent the lower open end of said bore, said first and second bore portions being joined by a tapered portion, said stem having an end thereof positioned within said bore, said stem end having an end portion with an outer diameter less than the outer diameter of the stem through a major portion of its length, said stem end portion being received in the first bore portion when said stem is attached to said auxiliary valve head, said stem end portion being joined to the major portion of said stem by a tapered area, the opposite ends of which have diameters equal to that of the stem end portion and the outer diameter of the major portion of the stem, said stem tapered area being positioned at said bore tapered portion, said first and second portions and said tapered portion having essentially mating configurations at said stem end portion and said tapered area, whereby, said stem end may be easily inserted into said bore with essentially no swaging of the material surrounding said bore and for maintaining proper alignment between said stem end portion and said auxiliary valve head.

2. The diaphragm-type flush valve of claim 1 wherein said stem end portion has a chamfered end for use in aligning said stem for positioning within said auxiliary valve head bore.

* * * * *